(12) United States Patent
Treuhaft et al.

(10) Patent No.: US 8,966,122 B2
(45) Date of Patent: Feb. 24, 2015

(54) CROSS-PROTOCOL COMMUNICATION IN DOMAIN NAME SYSTEMS

(75) Inventors: Noah Treuhaft, Oakland, CA (US); Douglas Tabacco, Novato, CA (US); Michael Damm, San Francisco, CA (US)

(73) Assignee: OpenDNS, Inc., San Francisco, CA (US)

( * ) Notice: Subject to any disclaimer, the term of this patent is extended or adjusted under 35 U.S.C. 154(b) by 228 days.

(21) Appl. No.: 13/448,368

(22) Filed: Apr. 16, 2012

(65) Prior Publication Data
US 2013/0275570 A1    Oct. 17, 2013

(51) Int. Cl.
*G06F 15/16* (2006.01)

(52) U.S. Cl.
USPC ........................................................ 709/245

(58) Field of Classification Search
CPC ... G06F 15/16; G06F 15/173; H04L 61/1511; H04L 29/12066; H04L 63/0227; H04L 63/08; H04L 51/12; H04L 67/306
USPC ........................................................ 709/223
See application file for complete search history.

(56) References Cited

U.S. PATENT DOCUMENTS

| | | | |
|---|---|---|---|
| 7,228,359 B1 | 6/2007 | Monteiro | |
| 7,412,515 B2 * | 8/2008 | Kupst et al. | 709/226 |
| 7,698,375 B2 | 4/2010 | Hinton et al. | |
| 8,224,994 B1 | 7/2012 | Schneider | |
| 8,561,161 B2 | 10/2013 | Blakley et al. | |
| 2005/0097179 A1 * | 5/2005 | Orme | 709/207 |
| 2006/0002308 A1 * | 1/2006 | Na et al. | 370/252 |
| 2007/0239865 A1 | 10/2007 | Tout | |
| 2007/0294419 A1 * | 12/2007 | Ulevitch | 709/230 |
| 2009/0113074 A1 * | 4/2009 | Statia et al. | 709/245 |
| 2010/0257232 A1 | 10/2010 | Joffray et al. | |
| 2010/0274970 A1 * | 10/2010 | Treuhaft et al. | 711/118 |
| 2011/0019547 A1 | 1/2011 | De Lutiis et al. | |
| 2012/0117649 A1 * | 5/2012 | Holloway et al. | 726/24 |
| 2012/0158969 A1 | 6/2012 | Dempsky et al. | |
| 2012/0278467 A1 | 11/2012 | Schneider | |
| 2013/0166520 A1 * | 6/2013 | Vass | 707/694 |
| 2013/0254423 A1 | 9/2013 | George, IV | |

FOREIGN PATENT DOCUMENTS

WO    WO01/41401 A2    6/2001

* cited by examiner

*Primary Examiner* — Dustin Nguyen
*Assistant Examiner* — Austin Moreau
(74) *Attorney, Agent, or Firm* — Vierra Magen Marcus LLP

(57) ABSTRACT

Systems and methods for processing domain name system requests in accordance with subscriber information are provided. A request for domain name information can be correlated with subscriber information using a subscriber identifier to resolve the domain name information at a domain name system (DNS) nameserver. The subscriber identifier and/or subscriber information may be transmitted from a DNS nameserver to a webserver using the domain name information provided in response to the subscriber's DNS queries. The subscriber identifier and/or information may be used in delivering a landing page or in facilitating proxying of resource requests for the requested domain.

19 Claims, 12 Drawing Sheets

CROSS-PROTOCOL COMMUNICATION IN DOMAIN NAME SYSTEMS

BACKGROUND OF THE INVENTION

1. Field of the Invention

Embodiments in accordance with the present disclosure relate to computer networks, and particularly to processing domain name system (DNS) information.

2. Description of the Related Art

Network resources such as those available via the Internet are accessed according to Internet Protocol (IP) addresses. IP addresses are represented numerically, traditionally as a quartet of values having the form 111.111.111.111. From the early inception of network computing, familiar alphanumeric name-based addressing has been used to allow users to more easily locate and remember the addresses for resources. For example, domain names are assigned to computing servers and clients. The domain name system facilitates the translation between IP addresses and domain names by maintaining accessible records that associate one or more domain names with one or more IP addresses.

While early network implementations could utilize a single periodically distributed ASCII file to translate between domain names and IP addresses, modern networks such as the Internet rely on the domain name system (DNS) for the resolution of names and addresses. FIG. 1 is a simplified block diagram illustrating traditional DNS processing. A client computing device 102 includes a resolver 104 for initiating DNS requests. The resolver may be a standalone component such as a software module of the client, or may be embedded within various applications such as web browsers, file transfer protocol programs, email applications, and the like that utilize Internet resources. When the client requests an Internet resource such as a web page or delivery of an email message, the resolver is charged with determining the IP address(es) of the requested resource so that the appropriate request can be issued to the appropriate address. The resolver is traditionally configured with the addresses of a group of ISP DNS Nameservers 110 that handle recursive DNS processing for the client device. As is often the case, the group of nameservers is provided by the Internet Service Provider (ISP) for the client device, although this isn't required. Nameservers 110 are recursive nameservers which resolve DNS requests using a recursive process that accesses various other nameservers in order to satisfy a given query.

Consider an example DNS request 150 from client 102 to nameserver 112 for the domain name information of "www.opendns.com". The ISP DNS nameserver first checks a local cache to attempt to resolve the request. The ISP DNS nameserver maintains the local cache with domain name records that have already been resolved to improve performance in responding to subsequent DNS requests. If nameserver 112 is maintaining the requested domain name in the local cache, it will issue a DNS response 152 to the client with the domain name record including the IP address of "www.opendns.com".

If the ISP DNS nameserver 112 does not have an entry for the requested domain name, it will launch recursive processing using authoritative DNS nameservers 120 and/or root DNS nameservers 130. An authoritative nameserver maintains an authoritative or master list for a zone which is a group of computing devices. Recursive DNS nameservers obtain domain name information such as the IP address of a requested resource from authoritative nameservers. The root DNS nameservers are also authoritative DNS nameservers. They are called root DNS nameservers because they contain the authoritative domain name information for a set of top level domains (TLDs) in the so-called root zone. For example the root DNS nameservers contain the IP addresses for finding domain name information for lower level domains in the top level domains. The top level domains include the generic top-level domains (gTLD) of .com, .org, .net, etc.

Nameserver 112 first issues a DNS request 154 to root DNS nameservers 130. The root DNS nameservers 130 can include multiple nameservers, one or more of which can be issued a request for the needed information. One of the nameservers 132 responds with a DNS response 156 including the IP address of one or more authoritative name servers for the ".com" domain. When ISP DNS nameserver 112 obtains the IP address for the ".com" domain, it issues another DNS request 158 to the specified one of the authoritative DNS nameservers 120. The specified authoritative nameserver will issue a DNS response 160 with the IP address of one or more nameservers for the "opendns.com" domain. This process repeats between the ISP DNS nameserver and the authoritative name servers 120 until the ISP DNS nameserver receives the IP address for "www.opendns.com". The client 102 application can then issue the resource request to the appropriate computer, such as an HTTP request to the server at the corresponding IP address.

FIG. 2 is a simplified block diagram of a typical authoritative DNS nameserver 120 as shown in FIG. 1 that can store domain name records. In this example, the authoritative DNS nameserver 120 is a computer system with a processor 150 coupled to a communications interface 160 and a memory or storage 170 via a system bus 152. The communications interface 160 exchanges data with a communications network, such as the Internet, via line 154. The processor 150 receives DNS requests from the Internet and resolves the DNS requests based on domain name records, such as a DNS record 180 stored in memory 170. The DNS record 180 includes a domain name 182, which is used as a key to lookup a corresponding IP address 184, and includes a time-to-live (TTL) value 186. The TTL value for the DNS record can be set by the administrator of the authoritative DNS nameserver. The TTL value is provided as part of the DNS response to DNS requests and is used by the receiving nameservers to control how long the DNS record should be maintained and treated as valid.

DETAILED DESCRIPTION

Figure 1:
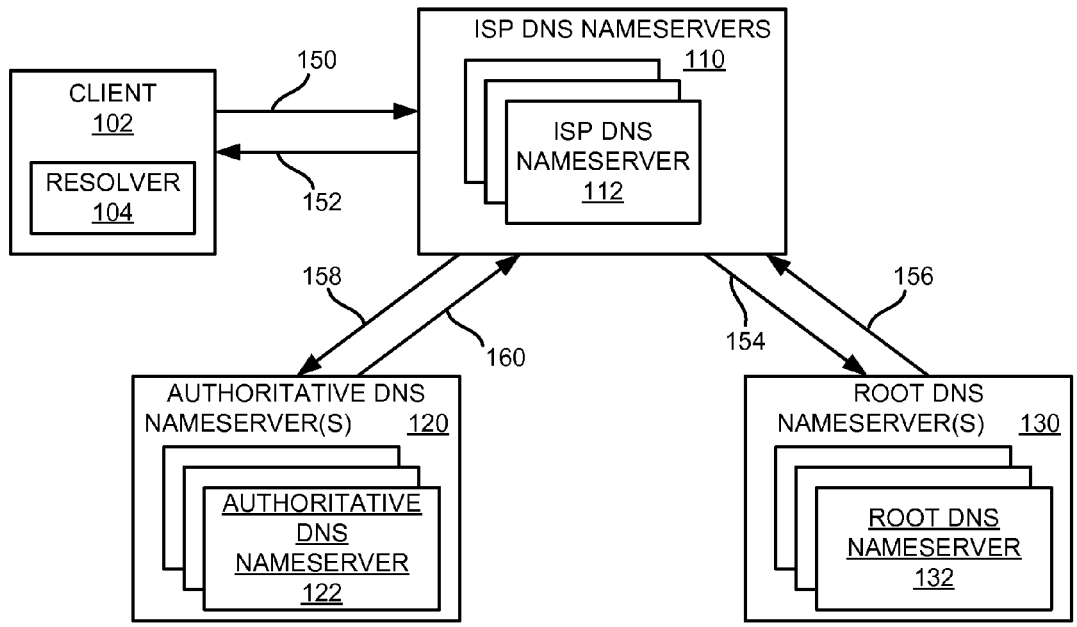
FIG. 1 is a simplified block diagram of a computer network depicting traditional processing of DNS requests.
Figure 2:
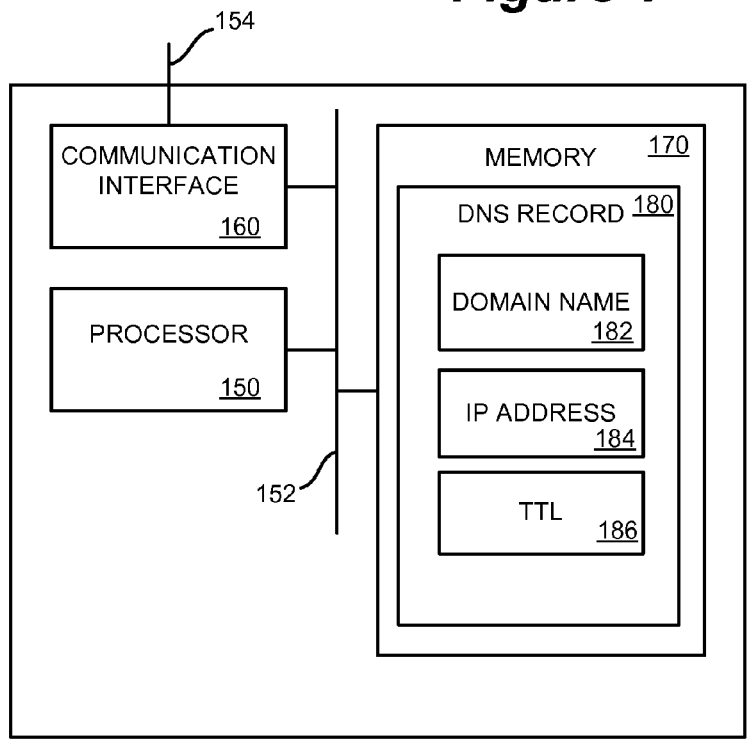
FIG. 2 is a simplified block diagram of an example of an authoritative DNS name server.

Systems and methods for processing domain name system requests in accordance with subscriber information are provided. A request for domain name information can be correlated with subscriber preferences using a subscriber identifier to resolve the domain name information at a domain name system (DNS) nameserver. Access to flagged domain names may be blocked or proxied in accordance with the subscriber preferences. In response to a flagged domain name, a client device may be redirected to a web server of an alternate domain that can provide a landing webpage or other alternate resource. The web server may alternately proxy the subscriber requests for the requested domain. The subscriber identifier and/or subscriber preferences may be transmitted from the DNS nameserver to the webserver using the domain name information provided in response to the subscriber's DNS queries. The subscriber identifier and/or preferences may be used in delivering the landing page or in facilitating proxying of the resource requests for the requested domain.

In one embodiment, a method of domain name system (DNS) processing is provided that includes receiving at a DNS nameserver a request for target domain name information. The nameserver determines that the request is associated with a first subscriber of DNS resolution services provided by the DNS nameserver and in response, accesses a first subscriber identifier and subscriber information associated with the first subscriber identifier. The nameserver determines that the first subscriber is not permitted direct access to the target domain and in turn generates a first DNS reply including domain name information associated with a block page service at a web server associated with the nameserver.

The block page service receives a resulting resource request from the first subscriber, specifying the domain name information of the block page service but requesting a resource from the target domain. If the request does not include a bypass cookie for the target domain name, the block page service redirects the first subscriber to an identification service. The nameserver then receives a request for domain name information of the identification service from the user. The nameserver accesses the first subscriber identifier and embeds at least a portion of the identifier into the domain name information for the identification service. The nameserver then generates a reply including the domain name information with the embedded first subscriber identifier. The identification service then receives a resource request from the first subscriber that passes the embedded subscriber information. The identification service determines the first subscriber identifier and generates a cookie for the block page service that includes the first subscriber identifier. The identification service also generates a redirect to the block page service, passing the cookie with the subscriber identifier. The block page service then receives a resource request with the cookie having the subscriber identifier. The block page service can access subscriber information based on the subscriber identifier to determine how to respond to the resource request. For example, if the first subscriber is permitted access to the target domain, the block page service can generate a cookie for the target domain and a redirect for the first subscriber to the target domain. Because of the nameserver resolution, the subsequent resource request for the target domain will be received at the block page service. The block page service can proxy the first subscriber's request based on the cookie. If the first subscriber is not permitted access, the block page service may use the first subscriber identifier to generate a customized landing or blocking page to provide in response to the user's request for the target domain.

Figure 3:
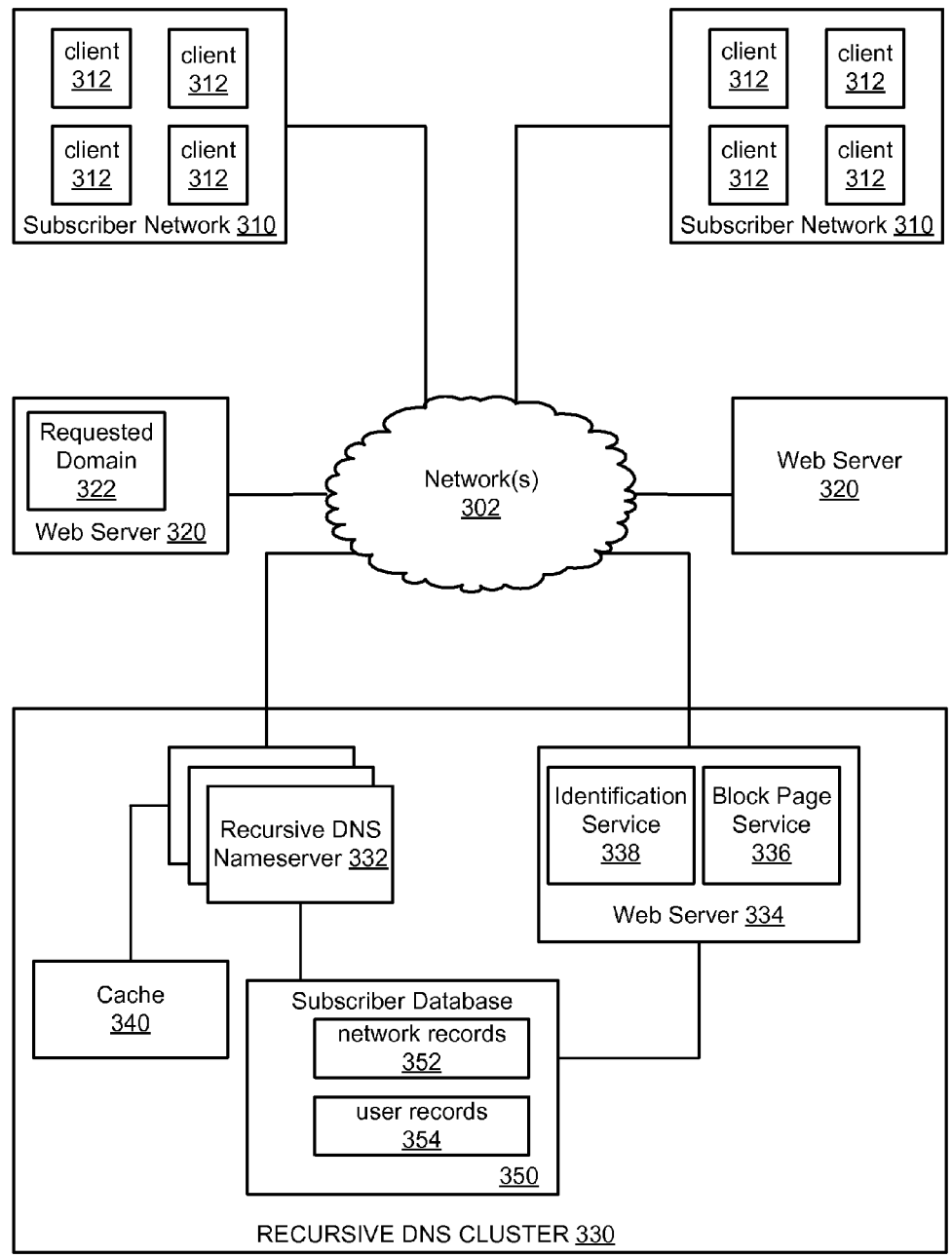
FIG. 3 is a simplified block diagram of a computing system including a recursive DNS nameserver in accordance with one embodiment of the disclosed technology.

FIG. 3 is a block diagram of a system for processing domain name system (DNS) requests in accordance with one embodiment of the present disclosure. Subscriber networks 310, web servers 320 and a recursive DNS cluster 330 are each in communication with one or more network(s) 302. Although two subscriber networks with four client devices each are shown, any number of subscriber networks or client devices may be used.

Network(s) 302 and 310 can include any combination of local area networks, wide area networks (WAN), the Internet, and/or any other network. The recursive DNS clusters can vary by implementation and include any suitable computing system such as a server, group, grid, or distributed platform of computer systems configured to respond to requests for domain name information. While the cluster in FIG. 3 is depicted with multiple recursive DNS nameservers, other embodiments may include a single computing system within a cluster such as a single server. The individual recursive nameservers in a cluster can be formed of hardware and/or software configured as described for domain name resolution. By way of non-limiting example, the various nameservers can include personal computers, servers, workstations, mainframes, etc.

Each of the recursive DNS nameservers in a cluster resolves requests for domain name information from other computing devices such as client devices 312 operated by individual users on a subscriber network 310. The nameservers 332 in cluster 330 include or are in communication with a local cache 340 and subscriber database 350. The domain name information stored in the cache can be any type of information associated with a domain name. Some examples of domain name information are resource records, such as "A" records used for storing a 32-bit IP address associated with a domain name, "AAAA" records used for storing an IPv6 128-bit address associated with a domain name, and "CNAME" or canonical name records for a DNS alias. A request for domain name information can include a packet, cell, message, or signal used to ask for domain name information.

The cache at each cluster facilitates more efficient responses to DNS requests by storing domain name information such as DNS records corresponding to previously received DNS requests. The cache may also store other domain name information, such as pre-fetched domain name information. If the cache contains the DNS record(s) needed to respond to a DNS request, the DNS nameserver can return the cached information without contacting other nameservers to fulfill the request.

When DNS requests from client 312 or other computing devices cannot be fulfilled with cached domain name information, the recursive DNS cluster initiates recursive processing to determine the needed information. For example, a DNS nameserver 332 may first issue a DNS request to one of the root servers for generic top level domain information, followed by one or more DNS requests to various authoritative name servers to determine the requested domain name information.

A response can also include a packet, cell, message, or signal used for transmitting domain name information. A Uniform Resource Locator (URL) identifies resources available through network hosts. Some examples of URLs are http—HTTP resources, https—HTTP over SSL, ftp—File Transfer Protocol, mailto—E-mail address, ldap—Lightweight Directory Access Protocol lookups, file—resources available on the local computer or over a local file sharing network, news—Usenet newsgroups, gopher—the Gopher protocol, telnet—the TELNET protocol, and data—the Data: URL scheme for inserting small pieces of content in place. Typically, a URL includes domain names that form a portion of the URL.

Each nameserver can also provide all or part of the subscriber information for the cluster or other types of storage can be used. The subscriber information in each cluster provides an indication to the recursive DNS servers of how to resolve requests for domain name information for different senders, owners, users, or subscribing entities associated with requests for domain name information. Examples of subscriber information include preferences, rules, policies, regular expressions, and the like.

In response to a DNS request for domain name information associated with a domain name, a recursive DNS nameserver within a cluster can determine a subscriber identifier. A subscriber identifier discriminates the sender, owner, user, or subscribing entity associated with the request for domain name information. Some examples of a subscriber identifier are IP addresses, userid's, and secure tokens. If an IP address identifier is used, the recursive DNS nameserver can inspect the network packet containing the request to determine the source IP address of the packet. A username or secure token may be included in the request for domain information from which the recursive DNS nameserver determines the subscriber identifier and the subscriber information. In one example, a device or application on a subscriber's network is setup to modify DNS requests to include such identifiers.

In various embodiments, an extension of the DNS protocol called EDNS may allow more flags, label types and return codes to be defined. EDNS may allow the sender of a DNS message (e.g., client device 112) to advertise its own extended capabilities to the message receiver (e.g., DNS nameserver 332). This may be accomplished through the inclusion of an OPT pseudo-RR in the additional data section of a request or response. The OPT pseudo-RR may include one or more EDNS options. In one example, a client device 312 can supply a device ID to DNS nameserver 332. For example, a DEVICE ID resource record (RR) may be provided in the additional section of a DNS query. The RR can appear in the DNS query's additional section, causing DNS nameserver 332 to interpret the last eight octets of the section as a device ID. The device ID can act as an index into a database of subscriber information associated with DNS nameserver 332. Other subscriber identifiers and techniques for determining the same can be used.

A subscriber is generally an individual and/or entity that agrees to service conditions of an operator of a recursive DNS cluster 330. Subscribers may range from entities operating large networks 310, such as those provided by a wireless service providers or large corporations, to individuals having a home internet connection. It is noted that while subscriber networks 310 are depicted with multiple client devices 312, that is not required. In a simple example, the subscriber may operate a single personal computer with an internet connection. Embodiments in accordance with the present disclosure may be applied in any type of environment.

The recursive DNS nameserver resolves a particular request for domain name information based on the subscriber information to generate a response in one embodiment. The recursive DNS nameserver then returns the response to the subscriber or a user associated with a subscriber, providing the resolved domain name information in accordance with the subscriber information. By way of example, a substitute network (e.g., IP) address that satisfies a substitution criterion for the domain name in the request for domain name information may be obtained.

In addition to determining an IP address for a domain name, nameservers 332 may use network records 352 and/or user records 354 in subscriber database 350 to determine a particular IP address to resolve for a given domain name. The network and user records may specify one or more DNS resolution options, filters, features or other techniques for determining what IP address to resolve for a given domain name. For example, in providing DNS services to the DNS client, the DNS servers may provide resolved domain name information or redirect the DNS client to another location based on subscriber information stored at the DNS servers that indicates how an end user wants the DNS servers to employ the DNS resolutions options or features. In various examples, the DNS cluster may provide various DNS resolution options or features, such as misspelling redirection, parental filters, domain blocking, or phishing protection through the DNS process.

In some embodiments, a user or subscriber of a service provided by the DNS cluster may set one or more preferences or selections for how the options are to be enabled or otherwise applied when a DNS nameserver 332 resolves DNS queries associated with the user. Preferences or settings for a user or subscriber may be stored as subscriber information at subscriber database 350 or in one or more storage devices accessible to the DNS cluster 330. Upon identifying the user, subscriber information associated with the user may be used to alter the IP address in a DNS response that the user receives. For example, a user or subscriber may establish subscriber information that instructs the DNS nameserver to alter responses to DNS requests that are associated with adult web sites, potential phishing or pharming sites, and other sites deemed inappropriate by the user or to which the user wishes to block or filter access, etc. Web server 334 and nameserver 332 each have access to subscriber database 350. In FIG. 3, the web server and nameserver utilize a single database but individual databases containing the same information may be used in other embodiments.

Network records 352 specify preferences or selections for resolving domain name queries associated with a particular subscriber's network or networks 310. The subscriber may specify resolution preferences that will apply to all traffic originating at their network 310 in one embodiment. DNS nameserver 332 can use a network identifier, such as an IP address from which the DNS query was issued, to determine a corresponding network record 352. A subscriber may set permissions and preferences in network records to indicate that certain preferences can be bypassed by particular users of the subscriber's network. For example, an administrator for a corporate network 310 may set up network records 352 to allow certain users of network 310 to bypass particular preferences in the network records, such as those blocking access to certain domains. Alternatively or additionally, permissions and preferences for overriding network preferences may be included in user records 354.

User records 354 include subscriber information for individual users or entities using the services of DNS cluster 330. An individual user may specify resolution preferences or selections that will apply to individual DNS requests issued by the user. DNS nameserver 332 can use a subscriber identifier such as a userid, token or other identifier to determine a corresponding user record 354 for a particular request. As will be described in more detail hereinafter, the user records may not be used in some examples by the DNS nameservers 332, but used by identification service 338 and/or block page service 336 in processing user resource requests. User records and network records may be used together to determine a set of permissions or preferences for applying to any individual request for domain name information, or requests for actual resources as will be explained hereinafter. For example, a user may set a preference in a user record allowing access to a certain category of domains, while a network record may indicate that users are not allowed to override the network preference set by the subscriber. In this manner, the nameservers 332, block page service 336 and/or identification service 338 operating as set forth below may use both types of records in responding to a resource request or DNS request. This permits a user to define a set of user preferences that can be applied when using different subscriber networks 310.

The domain name records in cache 340 may be associated with or have therein one or more flags. A flag can be any indicator, marking, or symbol associated with a domain name. For example a binary indicator stored in the domain name record can be used. A flag may be used to identify any type of information for a particular domain. For example, a flag may be used to mark a domain name as suspicious or untrustworthy, such as a site engaged in pharming or phishing activities. A flag may also indicate that a domain hosts illegal material, hate speech, pornography, material related to drugs or alcohol, or otherwise objectionable material that a subscriber does not wish to access or permit access to. Any number of flags can be used to create any number of categorizations for domain names. For example, flags denoting various levels of adult material may be used to classify domain according to their age-appropriateness. Flags can also be set in domain name records to cause requests for a particular domain to be proxied. This can allow a subscriber to have traffic for certain domain names proxied, for example for logging, auditing and the like, while traffic for all other domains is not proxied.

When a request for domain name information is received, the DNS nameserver 332 resolves the domain name query using the subscriber information and any flags in the domain name record. For example, a network record for a DNS request may set a preference that a particular category of domains or a particular domain is to be blocked from access by devices on the network. If a DNS request is for a domain having a flag matching such a preference in the network record, the DNS nameserver may generate a DNS response with a substitute IP address that directs the client device to an alternate domain. In one example, the DNS nameserver provides the client device with domain name information associated with block page service 336 on web server 334. In response to the client device's resource request, the block page service can provide a block or landing page to the client device, for example, informing the user that the requested domain is not accessible on their network. The block or landing page refers generally to any resource or information provided by the block page service in response to a request for a target domain that is not an actual resource provided by the target domain.

Because of the unique and differing communication protocols employed by DNS nameservers and web servers, provision is made to facilitate the correlation or tracking of DNS requests received at DNS nameserver 332 with corresponding resource requests received at web server 334. Identification service 338 is provided in one embodiment to facilitate the transmission of information from recursive DNS nameserver 332 to web server 334 through and using client 312, specifically through the use of domain name responses and resource redirects to convey subscriber information. For example, a user of a client device 312 and/or subscriber network 310 can be associated with a subscriber ID in subscriber database 350. The recursive DNS nameserver may use the subscriber ID to determine subscriber information such as a network record 352 or user record 354 that is used in resolving a DNS request. In some instances, the user may be provided with domain name information for block page service 336, such as when a requested domain is to be blocked or proxied according to the subscriber information. Identification service 338 facilitates the determination of a subscriber ID associated with a resource request that is received at web server 334 as a result of recursive DNS nameserver providing the domain name information for block page service 336. Identification service 338 can communicate with recursive DNS nameserver 332 through a client 312 that is communicating with the nameserver 332 using the DNS protocol and web server 334 using a standard resource-based protocol such as HTTP. A subscriber ID and/or subscriber information can be transmitted from the nameserver 332 to the web server 334 using the client device 312, without requiring input from the user or active authentication by the user in one embodiment.

The transmission of information from the nameserver to the web server permits block page service 336 to utilize user records 354 and network records 352 in response to resource requests that result from the name server 332 providing domain name information for the block page service in response to requests for a requested domain. Identification service 338 can seamlessly determine a subscriber ID or other information from name server 332 during the client's resource request. In one example, name server 332, in response to DNS requests for the domain of identification service 338, responds by encoding within the IP address provided in response to the DNS request, information identifying the user or subscriber issuing the request. When identification service 338 receives the resource request having the IP address provided by name server 332, it can determine the information relating to the subscriber provided by DNS name server 332.

Figure 4:
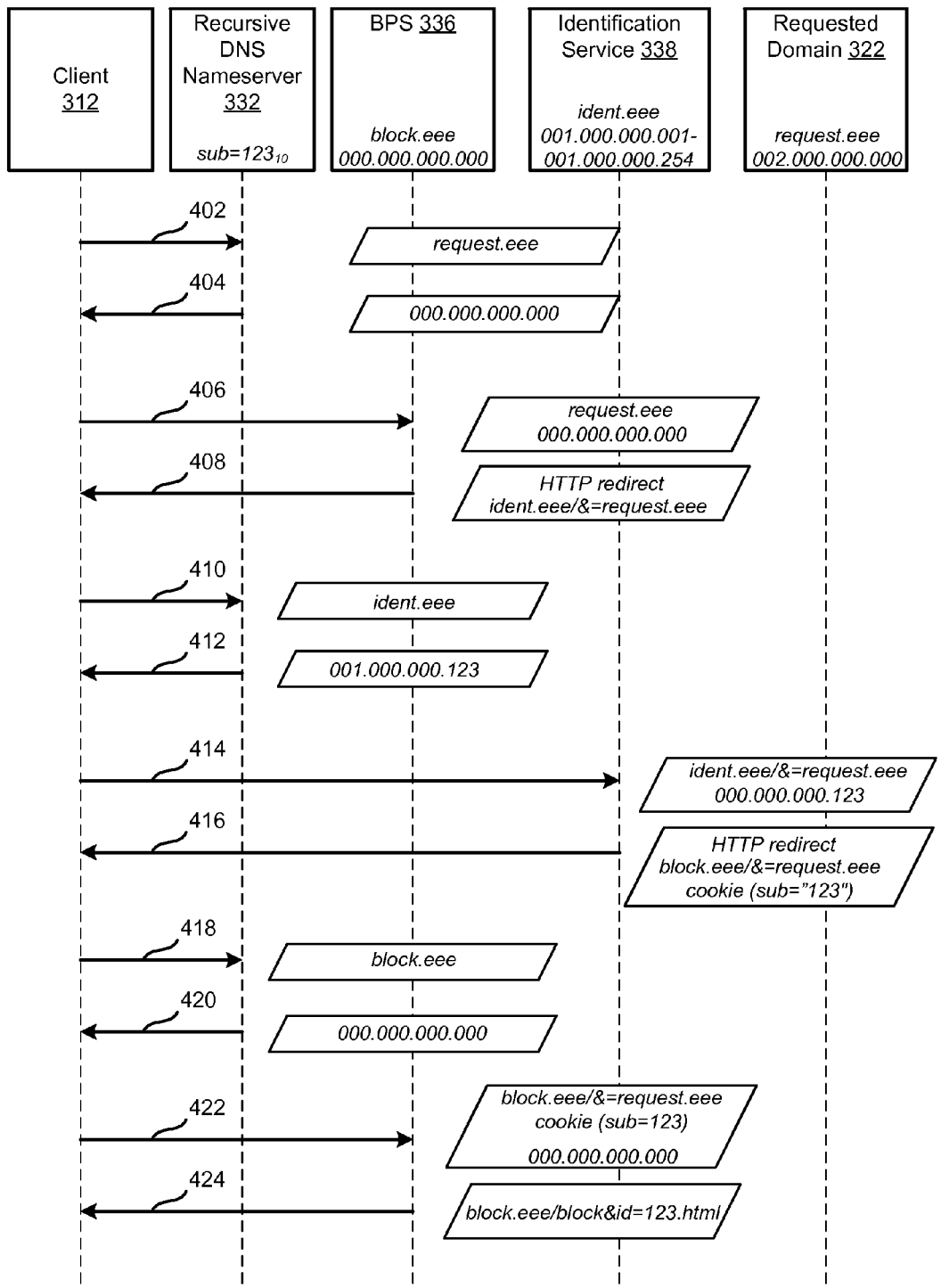
FIG. 4 is a timing diagram depicting traffic between various components of FIG. 3 when processing a DNS request in one embodiment.

FIG. 4 is a diagram depicting traffic between a client device 312 located at a subscriber network 310, and various components of DNS cluster 330 when resolving a request for domain name information in one embodiment. A subscriber, via a client device 312, issues domain name system request 402 to one of the recursive DNS name servers 332. In this particular example, request 402 is for the domain name information of a domain "request.eee."

In response to request 402, name server 332 obtains domain name information (e.g., "002.000.000.000") for the requested domain name. The name server may acquire a domain name record for the requested domain name from cache 340 in one example. If a domain name record is not available for the requested domain name, the name server may recursively resolve the domain name information by issuing a request to one or more root, authoritative and/or other recursive domain name servers.

The nameserver also determines a subscriber ID associated with the DNS request. In one example, the nameserver determines a userid or token passed with the DNS request as earlier described. Using the subscriber ID, the nameserver obtains subscriber information, including a network record and/or user record from database 350, for a particular subscriber associated with the DNS request. The user and network records can be correlated to determine if the individual subscriber is permitted access to the requested domain when on the particular subscriber network 310. In this example, the requested domain is associated with one or more flags corresponding to one or more preferences of the subscriber indicating that the domain name information should not be provided. For example, the network record associated with the IP address may indicate that no subscribers from that network may access the requested domain or/and the user record may indicate that the subscriber does not wish to be provided with domain name information associated with that particular domain. Accordingly, nameserver 332 does not provide the domain name information ("002.000.000.000") for the requested domain name, but instead provides DNS response 404 with domain name information ("000.000.000.000") for block page service 336 at web server 334.

Next, block page service 336 receives a resource request 406 (e.g., HTTP). The request includes a resource locator ("request.eee") for requested domain 322, but domain name information for block page service ("BPS") 336. As a result, BPS 336 examines the request to determine if a subscriber ID is included. For example, BPS 336 may receive a cookie or other predetermined identifier for the BPS domain including the subscriber ID as described below. In this example, BPS 336 is unable to determine the subscriber ID and in turn, issues a resource reply 408 containing an HTTP or other redirect to identification service 338. An example redirect is shown where the reply includes a redirect resource locator "ident.eee/$=request.eee." The redirect locator redirects the client device to the identification service at "ident.eee." The redirect locator also includes the original request locator "request.eee" provided in request 406 so that the original request can be tracked through the various components of the DNS cluster.

Client 312 receives response 408 including redirection to the identification service. Client 312 issues DNS request 410 to nameserver 332 for the domain name information of the identification service ("ident.eee). Nameserver 332 is configured to institute a subscriber identification lookup and embed operation in reply to DNS queries identified for the identification service. In reply to a DNS query 410 for the identification service, nameserver 332 determines a subscriber identifier associated with the DNS request. Determining the subscriber ID may be performed as described with respect to DNS query 402.

In reply to DNS query 410, nameserver 332 issues a DNS reply having domain name information for the identification service 338. In addition to providing domain name information for the identification service, the nameserver provides information relating to the subscriber such as the subscriber ID or a portion thereof. In one example, nameserver 332 embeds at least a portion of the subscriber ID into the domain name information for the identification service. For example, nameserver 332 may embed the subscriber identifier into the IP address provided in DNS reply 412.

As shown in FIG. 4, identification service 338 is associated with IP addresses 001.000.000.001 through 001.000.000.254. That is, any resource request to an address in this range will be routed to web server 334. In this simplified example, subscriber identifiers may be established using base 10 numerical representations between 1 and 254. The nameserver can then use the last octet of the IP address provided for DNS queries for "ident.eee" to return the subscriber identifier as part of the domain name information in the reply. In this simplified example using 254 subscriber identifiers and 254 individual IP addresses for the "ident.eee" domain, a one-to-one transference can be obtained to directly embed the entire subscriber identifier into the IP address as the last octet of the IP address. In the example of FIG. 4, client device 312 is associated with a subscriber having a subscriber identifier (sub) equal to $123_{10}$. Accordingly, nameserver 332 sets the last octet of the IP address for ident.eee to "123" and generates DNS reply 412 to client 312 with the IP address "001.000.000.123" as the requested domain name information for the identification service. The subscriber identifier may be embedded in other portions of the IP address in other examples.

After receiving DNS reply 412, client 312 issues a resource request 414 to identification service 338. The resource request includes the redirect URL ("ident.eee/$=request.eee") provided by BPS 336 in response 408 and the IP address ("001.000.000.123") provided by nameserver 332 for the domain name information in reply 412. Identification service 338 retrieves the IP address specified in the resource request and isolates the last octet of the IP address in order to determine the subscriber identifier. Having determined the subscriber identifier, the identification service 338 generates a response 416 having information about the subscriber included therein. Response 416 includes an HTTP redirect to BPS 336. The redirect specifies a URL including the BPS domain ("block.eee") and indicating the original resource request ("request.eee") provided by client 312. The identification service also generates an identifier for the BPS domain having the subscriber identifier therein. For example, the HTTP redirect may include a cookie for the block page service containing the subscriber identifier ("123"). Client device 312 then issues a DNS query 418 to nameserver 332 for domain name information for the block page service. Nameserver 332 generates a reply 420 with the domain name information ("000.000.000.000") for the block page service.

Client 312 issues resource request 422 to the block page service. Request 422 includes a resource locator for BPS 336 that also indicates the original resource from request 406. Additionally, request 422 includes the identifier (e.g., cookie) passed to the client device 312 from identification service 338 with response 416. BPS 336 accesses the cookie to determine the subscriber identifier. Having determined the subscriber identifier, BPS 336 accesses subscriber database 350 and determines any user records 354 and/or network records 352 that match the subscriber identifier. It is noted that a network record may be determined by BPS 336 using the source IP address of the resource request rather than a subscriber ID in one example. BPS 336 uses the subscriber information to determine how to respond to the request for the requested domain 322. For example, BPS 336 may determine what flags, etc. are associated with the requested domain name and correlate those flags with any preferences in a user record 352 and/or network record 354. BPS 336 may use this information to determine if the subscriber associated with the subscriber ID is permitted access to the requested domain from the particular subscriber network 310. If the subscriber is permitted access, a redirect to the requested domain can be provided, including a cookie that indicates the subscriber may access the requested domain. If the subscriber is not permitted access, a block or landing page can be provided to the client device.

In FIG. 4, BPS 336 generates an example response 424 that includes a landing page indicating to the subscriber that they are not permitted access to the requested domain. The response or landing page can be customized based on the user record 352 and/or network record 354 in one example. For instance, the landing page may be customized with information the subscriber wishes to provide when domain requests are blocked. For example, an explanation of the reasons for blocking can be provided in accordance with subscriber preferences. In FIG. 4, the customized landing page is indicated as "block.eee/block&id=123.html," conceptually illustrating a landing page that is based on the subscriber identifier "123." In another example, response 424 may include another redirect to an alternate URL indicated in the subscriber information. For example, a subscriber may provide a URL to which requests for blocked domains are to be redirected. For example, a company subscriber may provide a company URL to redirect requests for blocked domains that originate from a company network.

Figure 5:
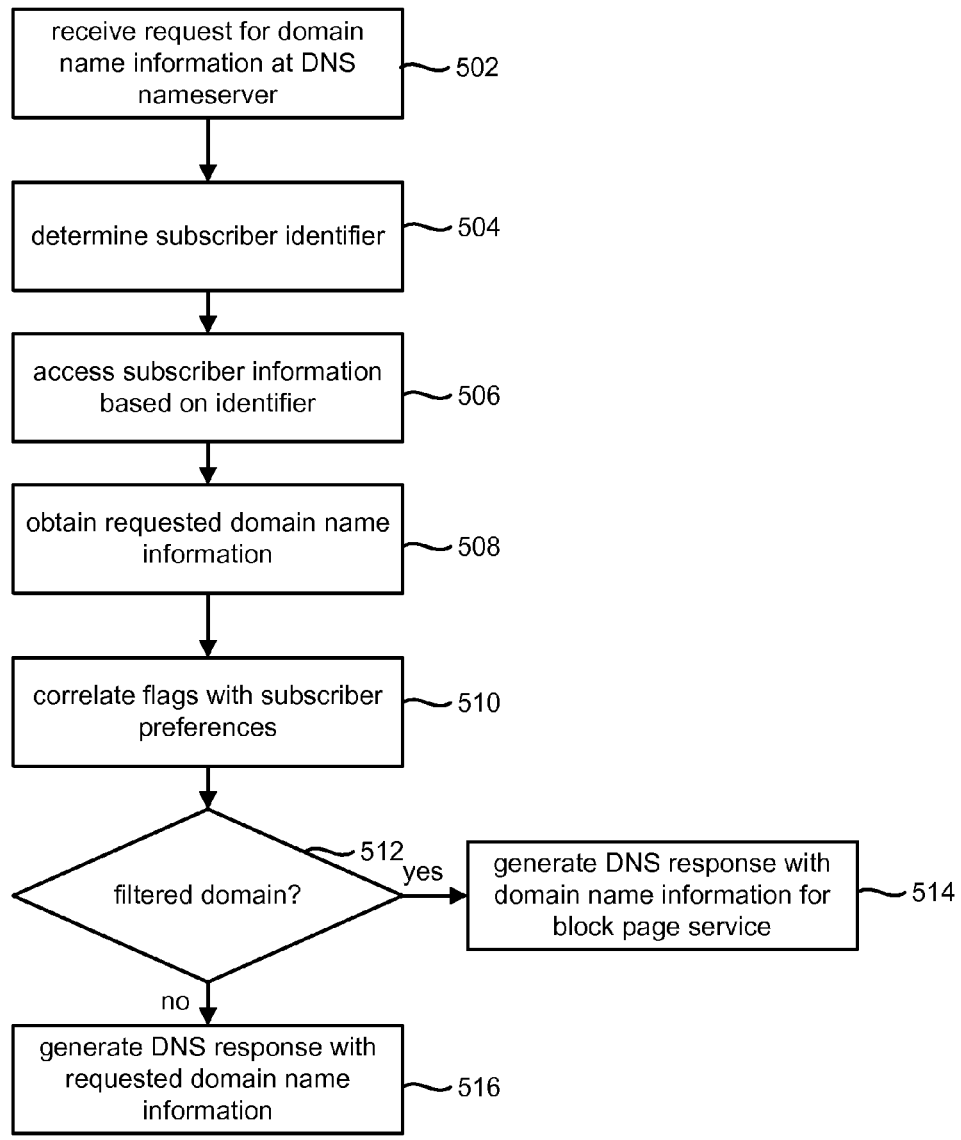
FIG. 5 is a flowchart describing a method of processing a DNS requests in accordance with one embodiment.

FIG. 5 is a flowchart describing a method of processing domain name requests by a recursive DNS nameserver in accordance with one embodiment of the present disclosure. For example, the process of FIG. 5 may be used by nameserver 332 to generate a response 404 to a DNS query 402 as shown in FIG. 4. At step 502, the DNS nameserver 332 receives a request for domain name information from a client device 312. At step 504, the DNS nameserver determines a subscriber identifier associated with the DNS request. In one example, the DNS nameserver parses the DNS request for the source IP address which is used as the subscriber identifier. In another example, a token or the subscriber ID itself may be passed with the DNS request. At step 506, the DNS nameserver uses the subscriber identifier to obtain a corresponding network record 352 and/or user record 354 from database 350. At step 508, the DNS nameserver obtains the requested domain name information. Step 508 may include determining the domain in the request and checking cache 340 for a domain name record corresponding to the requested domain. If the cache contains a domain name record for the requested domain and the record is not expired, the DNS nameserver obtains the cached domain name record. If the cache does not contain a domain name record for the requested domain or if the domain name record is expired, the DNS nameserver attempts to retrieve the domain name information using one or more authoritative and/or root DNS nameservers.

After obtaining the domain name information, the DNS nameserver determines whether there are any flags associated with the requested domain and if so, correlates the flags with the preferences in the network record 352 at step 510. Step 510 includes determining whether the domain name information for the requested domain includes any identifiers corresponding to preferences in the network record. For example, step 510 may include determining an age-rating for the domain and comparing that with an age-rating preference in the network record.

If any of the flags correlate to preferences in the network record, the DNS nameserver determines if any of the flags and corresponding network preferences indicate that the traffic to the domain should be filtered at step 512. In one embodiment, step 512 includes determining whether the network records indicate that the requested domain should be blocked for requests from the subscriber's network. Step 512 may also include determining whether the records indicate that traffic for the requested domain should be proxied, but access still allowed.

If the domain name information contains a flag indicating that the requested domain should be proxied or blocked, the DNS nameserver issues a DNS response at step 514 with domain name information for the block page service 336 at web server 334. If the domain is not to be blocked or proxied for the subscriber's network, the DNS nameserver issues a DNS response at step 516 with domain name information for the requested domain.

Figure 6:
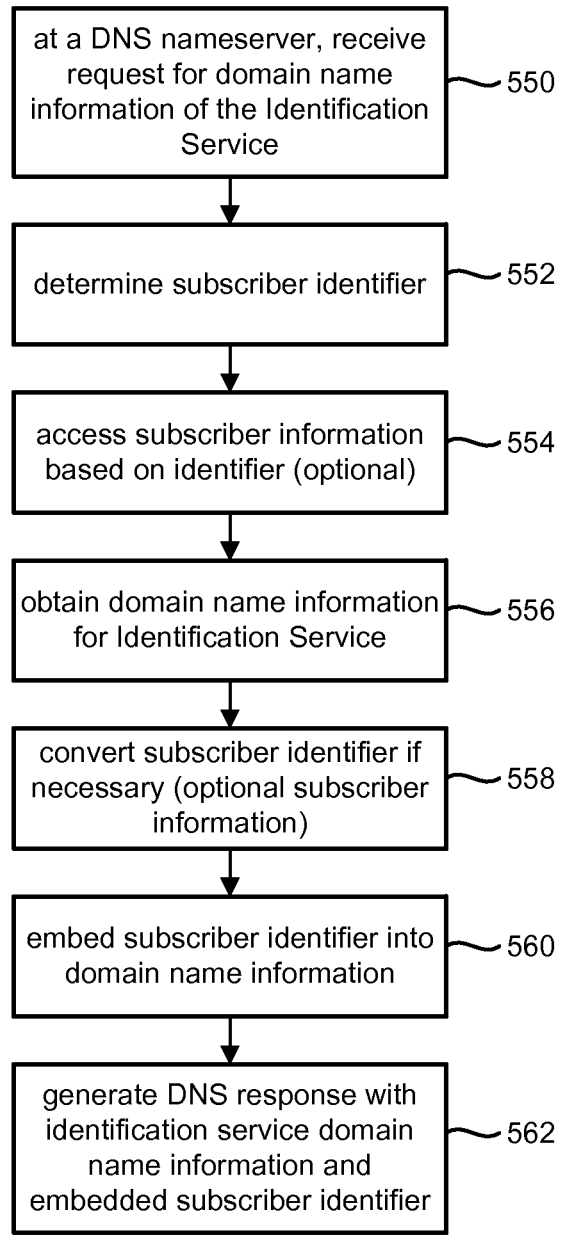
FIG. 6 is a flowchart describing a method of processing a DNS requests in accordance with one embodiment.

FIG. 6 is a flowchart describing a method for processing domain name requests by a DNS nameserver that includes adding subscriber information to a DNS reply. In one example, the method of FIG. 6 may be used as shown in FIG. 4 to receive a DNS query 410 for the identification service 338 and return a response 412 including subscriber information.

At step 550, the DNS nameserver receives the request for domain name information of the identification service. The DNS name server is configured to automatically reply to a request for domain name information of the identification service by the processing shown in step 552-562. Recall that in FIG. 4, the block page service 336 responded to a resource request for the requested domain by generating a response with a redirect to the identification service 338. In response to that redirect to the identification service, client device 312 issues a DNS request for domain name information for the identification service that is received at step 550.

At step 552, the DNS nameserver determines the subscriber identifier associated with the DNS request as earlier described. At step 554, the DNS nameserver optionally accesses subscriber information based on the subscriber identifier. In one embodiment, the nameserver may provide subscriber information in addition the subscriber identifier that is provided in the DNS response. At step 556, the DNS nameserver obtains the domain name information for the identification service. At step 558, the nameserver converts the subscriber identifier into a suitable format for transmission to the client device if necessary. For example, the nameserver may convert a binary subscriber identifier into a base 10 representation suitable for embedding in an IP address. Optionally the name server may convert the subscriber information into a format suitable for transmission. In other embodiments, a conversion may not be required at step 558 where the subscriber ID and/or information is already in a format suitable for transmission. At step 560, the DNS nameserver embeds the subscriber identifier and optionally any subscriber information into the domain name information for the identification service. In one embodiment the subscriber identifier is embedded into the IP address for the identification service. For example, the last octet of the IP address for the identification service that is provided to the client device may include or be a representation of the subscriber identifier. At step 562, the nameserver generates a DNS response including the domain name information for the identification service and having embedded therein the subscriber identifier. As will be described more fully hereinafter, multiple iterations of domain name information requests to the name server and IP addresses with embedded subscriber identifier data may be used, such as where the last octet of the IP address or other portion of the domain name information used to embed the subscriber identifier is not sufficient to include the entire subscriber identifier.

Figure 7:
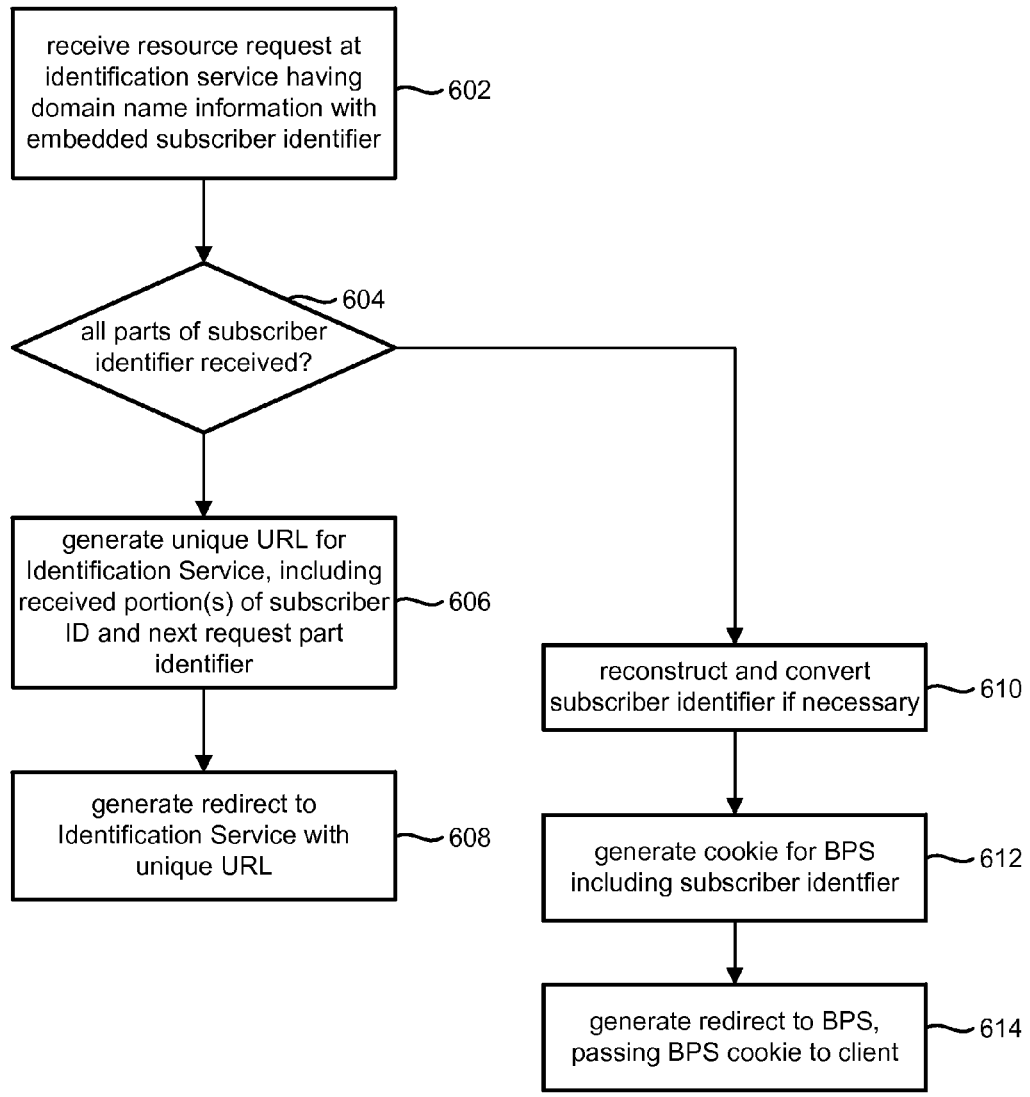
FIG. 7 is a flowchart describing a method of processing a resource request to determine subscriber information in accordance with one embodiment.

FIG. 7 is a flowchart describing a method for determining a subscriber identifier by the identification service 338 in one example. In one embodiment, the process of FIG. 7 can be performed when receiving a resource request 414 and generating a reply 416 as shown in FIG. 4.

At step 602 the identification service receives a resource request having domain name information with at least a portion of an embedded subscriber identifier. At step 604 the identification service determines whether all parts of the subscriber identifier have been received. In one example, a subscriber identifier can be entirely embedded or otherwise included within a single DNS response from nameserver 332 as shown in FIG. 4. In other examples, however, the subscriber identifier may be too large to be embedded entirely within a single DNS response. Accordingly, the identification service 338 can be preconfigured with an indication of how many resource requests from client devices are required in order to obtain the entire subscriber identifier from the DNS nameserver. Consider an example where the subscriber identifier is a 32-bit binary number and the last octet of an IP address is used to convey the subscriber identifier information from a nameserver to an identification service. Often, the last octet of an IP address may include usable values of 1 to 254 (base 10). Using the discreet individual values of 1 to 254, 7 binary bits may be conveyed using the base 10 values 1 to 254 for the last octet of the IP address. In this example, five individual communications between the nameserver and identification service may be required to transmit the full 32 bits of the subscriber identifier. Accordingly, the domain name server may select the last 7 bits of the subscriber identifier (the least significant 7 bits), convert them from binary to a base 10 representation between 1 and 254 and then transmit the representation to the client 312 as part of the domain name information. The client will then provide the information to the identification service when issuing a resource request. This process can be repeated four additional times to convey the required 32 bits of data between the name server and identification service.

Accordingly at step 604 the identification service determines whether all parts of the subscriber identifier have been received. If all parts of the subscriber identifier have not been received, the identification service generates a unique URL for the identification service at step 606. The unique URL includes any previously received portions of the subscriber identifier, as well as an identifier noting which part of the subscriber identifier is being requested. At step 608, the identification service generates a response including a redirect to the identification service with the unique URL. In response to the redirect, the client issues a DNS query to the nameserver passing the new URL. The nameserver will recognize the request part identifier to determine which portion of the subscriber identifier to embed in the DNS domain name information that will be included in the next DNS reply.

If all parts of the subscriber identifier have been received, the identification service reconstructs and converts (if necessary) the subscriber identifier at step 610. The unique URL includes any previously received portions of the subscriber ID as just described. Upon receiving the final resource request at step 602 and determining that all parts of the subscriber identifier have been received at step 604, the identification service can combine the previously received portions from the URL with the newly indicated portion to reconstruct the entire subscriber identifier. If necessary, the subscriber identifier can be converted, such as to convert a base 10 representation to a base 2 representation. At step 612, the identification service generates an identification cookie for the block page service that includes the reconstructed subscriber identifier. At step 614, the identification service generates a response to the client including a redirect to the block page service and passing the block page service cookie to the client device.

Figure 8:
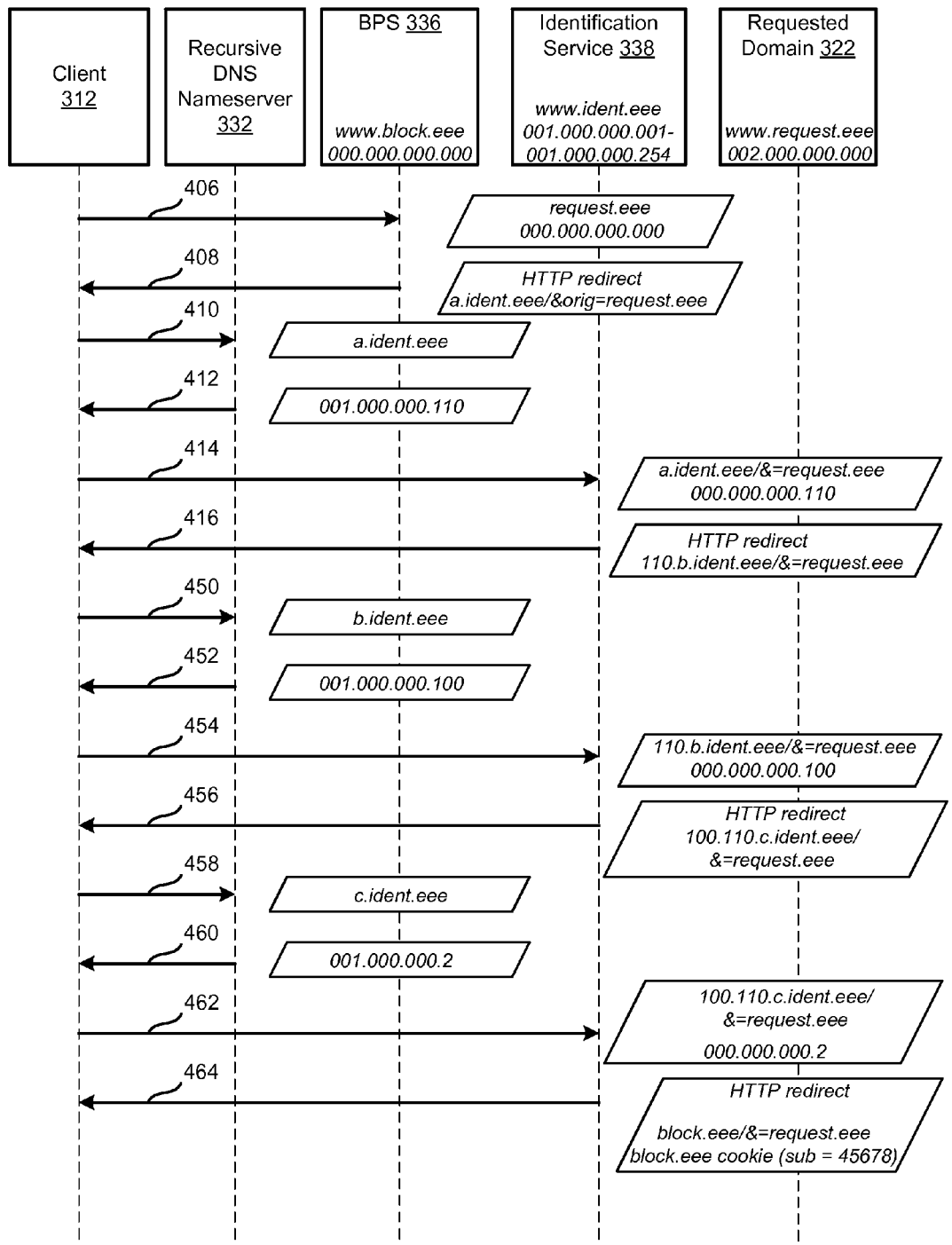
FIG. 8 is a timing diagram depicting traffic between various components of FIG. 3 when processing a DNS request in one embodiment.

FIG. 8 is a diagram depicting another example of traffic between the components of FIG. 3 when a iterative process is used to convey subscriber information between a nameserver and identification service as described in FIG. 7. In this example, the subscriber identifier is maintained as a binary number by the DNS cluster. In this specific example, the subscriber identifier is a 16-bit binary number, with the particular subscriber at client 312 being "1011001001101110" which is equivalent to "$45678_{10}$".

As with FIG. 3 and not repeated in FIG. 8, a DNS request for requested domain 322 is received at DNS nameserver 332 from client 312. Nameserver 332 responds with domain name information for block page service 336. A resource request 406 for "request.eee" is then received at BPS 338 from client 312. BPS 336 responds with a redirect URL to identification service 338 as in FIG. 3. Here however, in order to facilitate the iterative process, the redirect at 408 includes a part identifier "a" preceding the "ident.eee" domain to indicate that the redirect is for the first part of the subscriber identifier.

Client 312 then issues DNS query 410 to nameserver 332 requesting the domain name information for "a.ident.eee." Nameserver 332 examines the DNS query and determines that the request is for the identification service. Nameserver 332 recognizes the "a" indication preceding the domain name and correlates this with the transmission of the first part of the subscriber identifier. Accordingly, the nameserver extracts the final 7 bits ("1101110") of the subscriber identifier and converts them to their base 10 representation ("110"). Having extracted the final 7 bits of the subscriber identifier and converted it to a decimal representation, the nameserver generates an IP address ("001.000.000.110") for the identification service having the final octet ("110") equal to the decimal representation of the first 7 bits of the identifier. Nameserver 332 then issues DNS reply 412 to the client having the generated IP address.

Client 312 then issues a resource request to the identification service, passing the redirect URL ("a.ident.eee/&=request.eee") and the IP address "001.000.000.110" having the final octet corresponding to the subscriber identifier. The identification service recognizes the URL as indicating that the IP address contains the first part of the subscriber identifier corresponding to the final 7 bits. Accordingly, the identification service extracts the last octet of the IP address and generates another redirect for the client device. For the redirect, the identification service generates the URL "110.b.ident.eee/&request.eee." The redirect URL includes the notation "b" as an indication to the nameserver that the second part of the subscriber identifier is being requested. The redirect URL also includes the first part of the subscriber identifier "110" that was received in request 414. Identification service 338 then provides the redirect 416 to the client device with the generated URL.

Client 312 then issues DNS request 450 to nameserver 332 for the domain name information of "b.ident.eee." The nameserver determines that the second part of the subscriber identifier is being requested from the notation "b." Accordingly, the nameserver determines the subscriber identifier associated with the request and then extracts the second set of 7 bits ("1100100") from the subscriber identifier. The nameserver converts these bits from binary to base 10 ("100"). The nameserver then generates the domain name information for the identification service including the second part of the subscriber identifier as the final octet. The nameserver issues reply 452 to the client device with the generated URL having the subscriber information.

Client 312 then issues resource request 454 to the identification service. The request includes the redirect URL "110.b.identeee/&=request.eee" and the IP address "000.000.000.100." The identification service determines from the notation "b" that the last octet of the IP address includes the second part of the subscriber identifier. Accordingly, the identification service extracts the final octet and generates a final redirect URL to determine the final part of the subscriber identifier. The identification service adds the notation "c" in place of "b" to the received URL and appends the second part of the subscriber identifier "100" to the front of the URL to generate the redirect URL "100.110.c.ident.eee/&=request.eee." The redirect response 456 is then issued to client 312.

Client 312 then issues DNS request 458 to nameserver 332 for the domain name information of "c.ident.eee." The nameserver determines that the third part of the subscriber identifier is being requested from the notation "c." Accordingly, the nameserver determines the subscriber identifier associated with the request and then extracts the first two bits ("10") from the subscriber identifier. The nameserver converts these bits from binary to base 10 ("2"). The nameserver then generates the domain name information for the identification service including the first part of the subscriber identifier as the final octet. The nameserver issues reply 460 to the client device with the generated URL having the subscriber information.

Client 312 then issues resource request 462 to the identification service. The request includes the redirect URL "100.110.c.ident.eee/&=request.eee" and the IP address "000.000.000.2." The identification service determines from the notation "c" that the last octet of the IP address includes the first part of the subscriber identifier. Accordingly, the identification service extracts the final octet to determine the final part of the subscriber identifier. The identification service then reconstructs the subscriber identifier. Each of the subscriber portions are converted back to their binary representations and then put together to reconstruct the original identifier "1011001001101110."

After reconstructing the subscriber identifier, the identification service generates a cookie for the BPS domain that contains the reconstructed subscriber identifier. The identification service also generates a redirect URL (block.eee/&=request.eee) back to the BPS. The redirect and cookie are then passed to the client in response 464.

Figure 9:
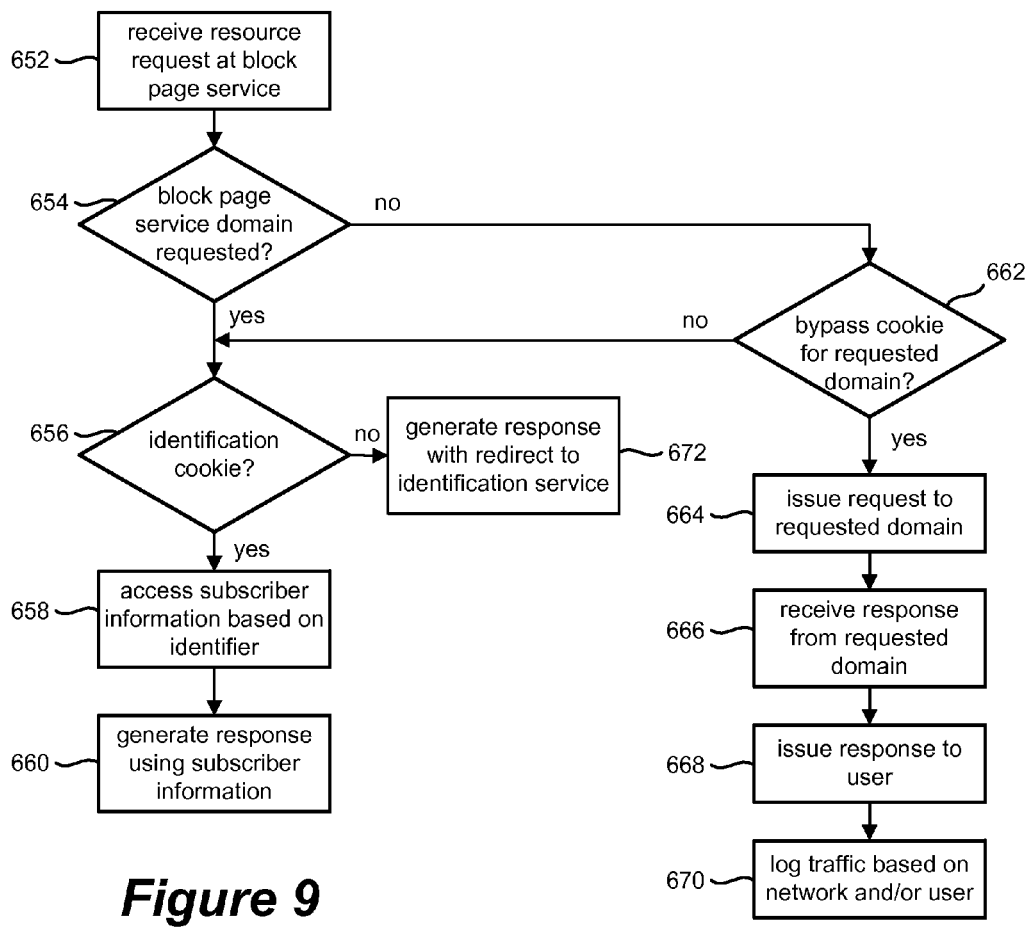
FIG. 9 is a flowchart describing a method processing resource requests at a block page service in accordance with one embodiment.

FIG. 9 is a flowchart describing a method of processing requests for blocked or filtered domains as may be performed by the block page service 336 in one embodiment. The process of FIG. 9 may be performed for a request issued by a client device after obtaining a DNS response generated by nameserver 332 at step 514 of FIG. 5 in one embodiment.

At step 652, a resource request for a requested domain name is received at the block page service 336. Step 652 is often an HTTP request specifying the requested domain and a network resource hosted at that domain, but any suitable protocol for requesting network resources may be used. At step 654, block page service 336 checks the resource request to determine the domain being requested. If the block page service determines that the BPS domain is being requested, the service inspects the request to determine whether an identification cookie for the subscriber is included at step 656. If the resource request includes an identification cookie, the block page service accesses subscriber information based on the subscriber identifier at step 658. For example, the block page service may access database 350 to determine one or more network records and/or user records associated with the subscriber ID. After obtaining the subscriber information, the block page service generates a response to the resource request at step 660. The response generated at step 660 is based on the subscriber information obtained in step 658.

Returning to step 656, if the user does request the block page service in the resource request received at step 602, but does not include an identification cookie, the block page service generates a response redirecting the client device to identification service 338 at step 672.

Returning to step 654, if the block page service determines that the requested domain is not that of the block page service, the block page service inspects the resource request for a bypass cookie corresponding to the requested domain. A bypass cookie may be generated for the requested domain and be previously set on the client device by the block page service to indicate that the particular subscriber is allowed access to the requested domain. In such an instance the block page service may issue a redirect to the client device for the requested domain and place a cookie on the client device for the requested domain. The client device will then issue a resource request to the block page service for the requested domain and pass the cookie. Using the cookie, the block page service can determine if the user is permitted access to the requested domain and in turn proxy the user's request by issuing its own request to the requested domain and then replying to the user with the requested information.

If there is no bypass cookie present for the requested domain, the block page service returns to step 656 to determine whether an identification cookie for the subscriber is present. If a bypass cookie for the requested domain is present, the block page service can proxy the request for the network resources set forth in step 664-670. A bypass cookie passed with the resource request will be set for the requested domain, not the domain of the block page service. The block page service issues a request for the network resource from the requested domain at step 664. Step 664 may include obtaining domain name information for the requested domain from local cache 340 or by resolving the domain name. At step 666 the block page service receives the network resource from the requested domain and issues a response to the client device at step 668 with the resource from the requested domain. The block page service may optionally log the traffic for auditing, etc. at step 670. Step 670 can include logging and associating the traffic with a particular user of client device 312 or only with a subscriber network 310 if the user is not authenticated.

Figure 10:
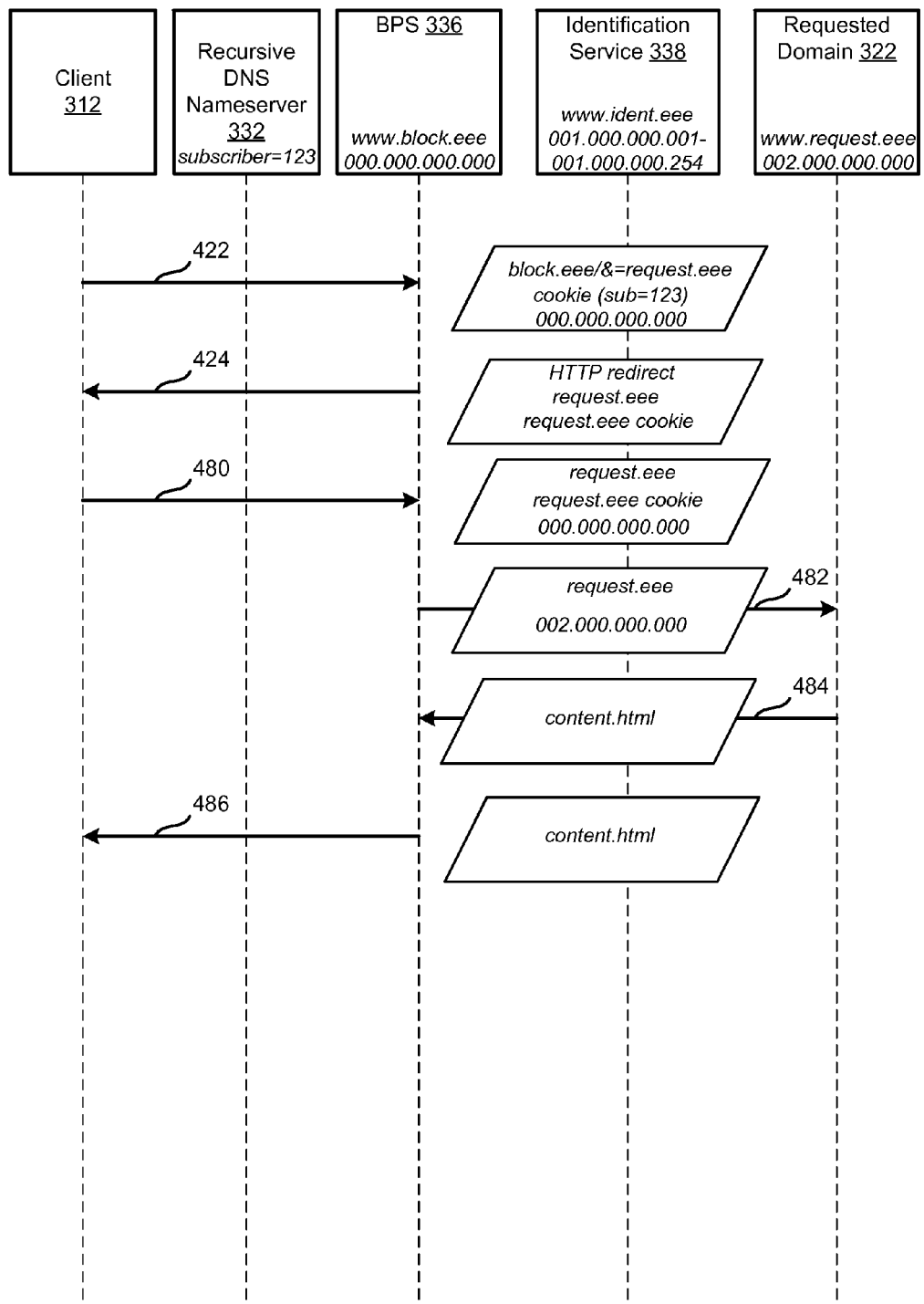
FIG. 10 is a timing diagram depicting traffic between various components of FIG. 3 when processing a DNS request in one embodiment.

FIG. 10 is a diagram depicting another example of traffic between the components of FIG. 3, illustrating an example where the block page service proxies requests on behalf of a subscriber based on subscriber information. Processing proceeds as described with respect to FIG. 3, with the block page service receiving resource request 422, specifying the block page service by the URL "block.eee/&=request.eee," passing a cookie for the block page service that specifies the subscriber identifier ("123"), and using the IP address "000.000.000.000" for the block page service. As earlier described, BPS 336 receives the request and in response to the BPS resource request, extracts the subscriber identifier "123" from the cookie. The BPS utilizes the identifier to determine subscriber information associated with the subscriber identifier. In this example, the subscriber information indicates that the particular subscriber is permitted access to the requested domain "request.eee." As such, BPS 336 generates response 424 with an HTTP redirect to the requested resource. BPS 336 also generates a cookie for the requested domain and passes that cookie to the client with the response.

After receiving response 424, client 312 generates a resource request 480, including a destination URL "request.eee" corresponding to the original request 406. Client 312 issues the request with the IP address "000.000.000.000" corresponding to BPS 336 based on the domain name response 404 which earlier provided the domain name information for the BPS in response to the resource request for the requested domain. If the client has purged its cache of the domain name information, another DNS query may be provided to the nameserver 332 which will again return the domain name information for the BPS based on the subscriber information.

Unlike resource request 406, resource request 480 includes the cookie passed to the client 312 from BPS 338 with response 424. BPS 338 determines from the cookie that the subscriber is permitted access to the requested domain "request.eee." Accordingly, BPS 338 issues a resource request 482 to the requested domain 322 on behalf of client 312. Resource request includes the requested resource from the client's original resource request 406. Request 482, however, includes the domain name information "002.000.000.000" for the requested domain. In response to request 482, the requested domain returns a resource (e.g., content.html) to BPS 336. BPS 336 in turn, issues a response 486 to the client device 312, passing the requested resource received from domain 322.

Figure 11:
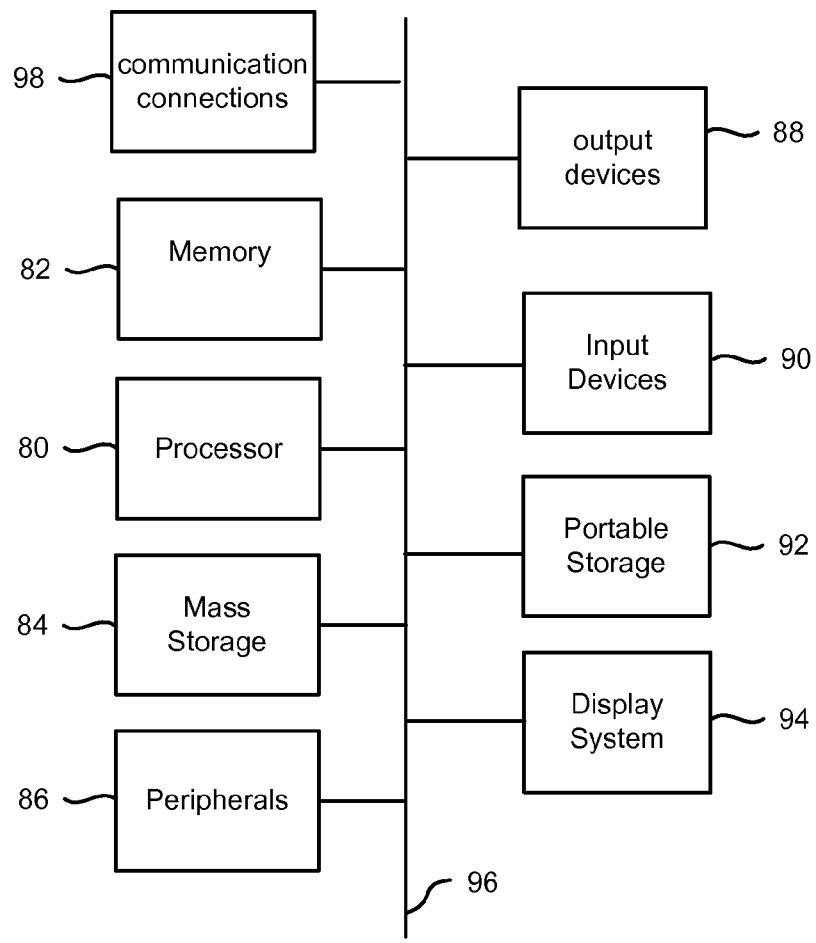
FIG. 11 is a simplified block diagram of a computing device that can be used to implement various embodiments of the disclosed technology.

FIG. 11 is a high level block diagram of a computing system which can be used to implement any of the computing devices of FIG. 3. The computing system of FIG. 11 includes processor 80, memory 82, mass storage device 84, peripherals 86, output devices 88, input devices 90, portable storage 92, and display system 94. For purposes of simplicity, the components shown in FIG. 11 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 11. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system of FIG. 9 will (optionally) have an output display system 94, which may include a video card and monitor. Output devices 88 can include speakers, printers, network interfaces, etc. Device 100 may also contain communications connection(s) 112 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 11 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The technology described herein, including the identification and block page services, can be implemented using hardware, software, or a combination of both hardware and software. The software used is stored on one or more of the processor readable storage devices described above (e.g, memory 82, mass storage 84 or portable storage 92) to program one or more of the processors to perform the functions described herein. The processor readable storage devices can include non-transitory, tangible computer readable media such as volatile and non-volatile media, removable and non-removable media. Tangible computer readable media may be implemented in any method or technology for storage of information such as computer readable instructions, data structures, program modules or other data. Examples of tangible computer readable media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other non-transitory, tangible medium which can be used to store the desired information and which can be accessed by a computer. In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more tangible computer readable media/storage devices, peripherals and/or communication interfaces. In alternative embodiments, some or all of the software can be replaced by dedicated hardware including custom integrated circuits, gate arrays, FPGAs, PLDs, and special purpose computers.

Figure 12:
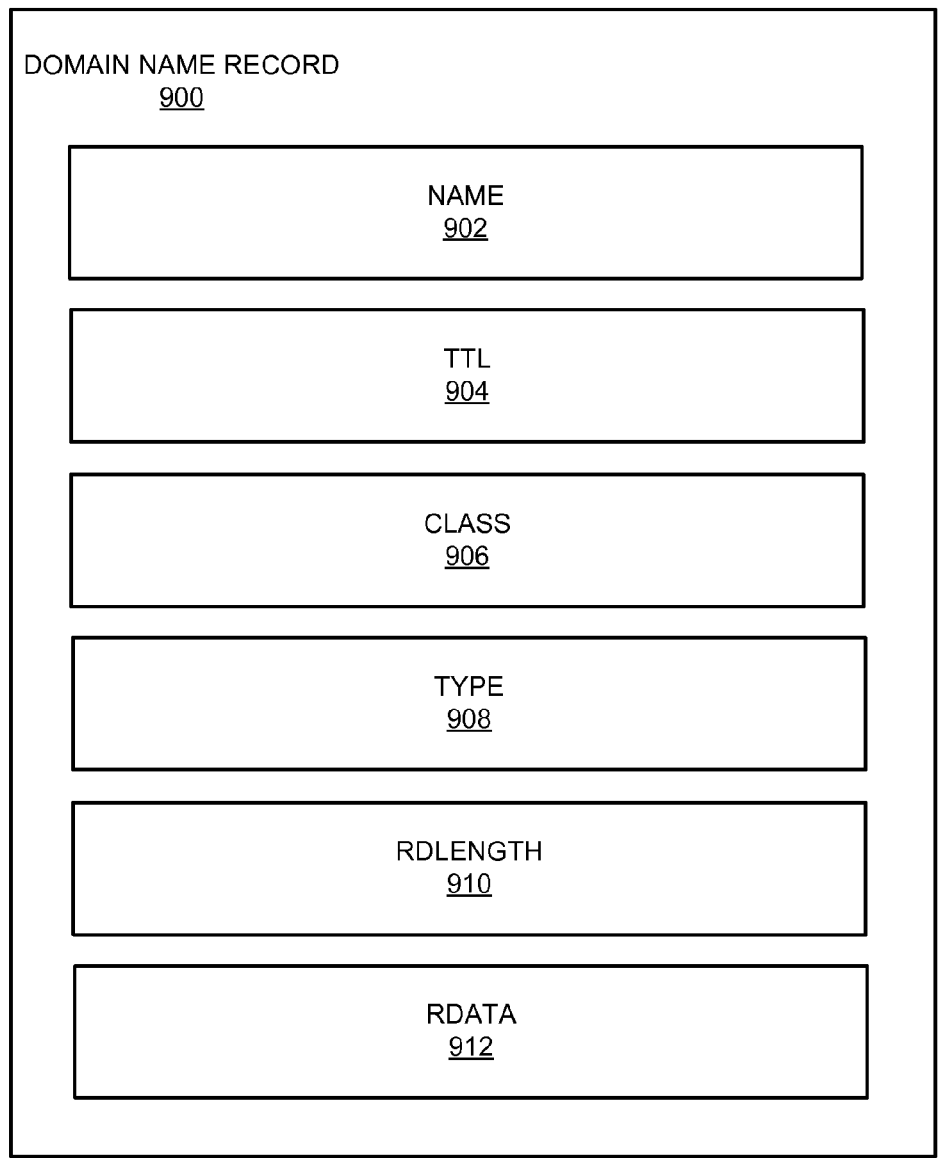
FIG. 12 depicts the structure of an example of a DNS resource record.

FIG. 12 is a block diagram depicting the structure of a domain name resource record that can be stored in the local cache at the recursive DNS clusters. Each resource record includes a name field 902, a TTL field 904, a class field 906, a type field 908, an RDLENGTH field 910 and an RDATA field 912. As earlier described, the TTL field sets the maximum amount of time for maintaining the resource record before it should be treated as invalid and expired. In accordance with one embodiment, the RDATA field is used for various flags that may be set by the recursive nameservers to indicate some additional information about the domain in addition to the standard DNS specified information. A flag can be any indicator, marking or symbol associated with a domain name, such as a binary indicator in part of the RDATA field. The flags may have various functions, including but not limited to marking domain names as suspicious or untrustworthy, such as a web site associated with phishing activities. Flags may be used to indicate various types and levels of information. For information, social networking or pornographic web pages may be flagged so that the nameserver can provide alternate or additional information when a client issues a request.

Figure 13:
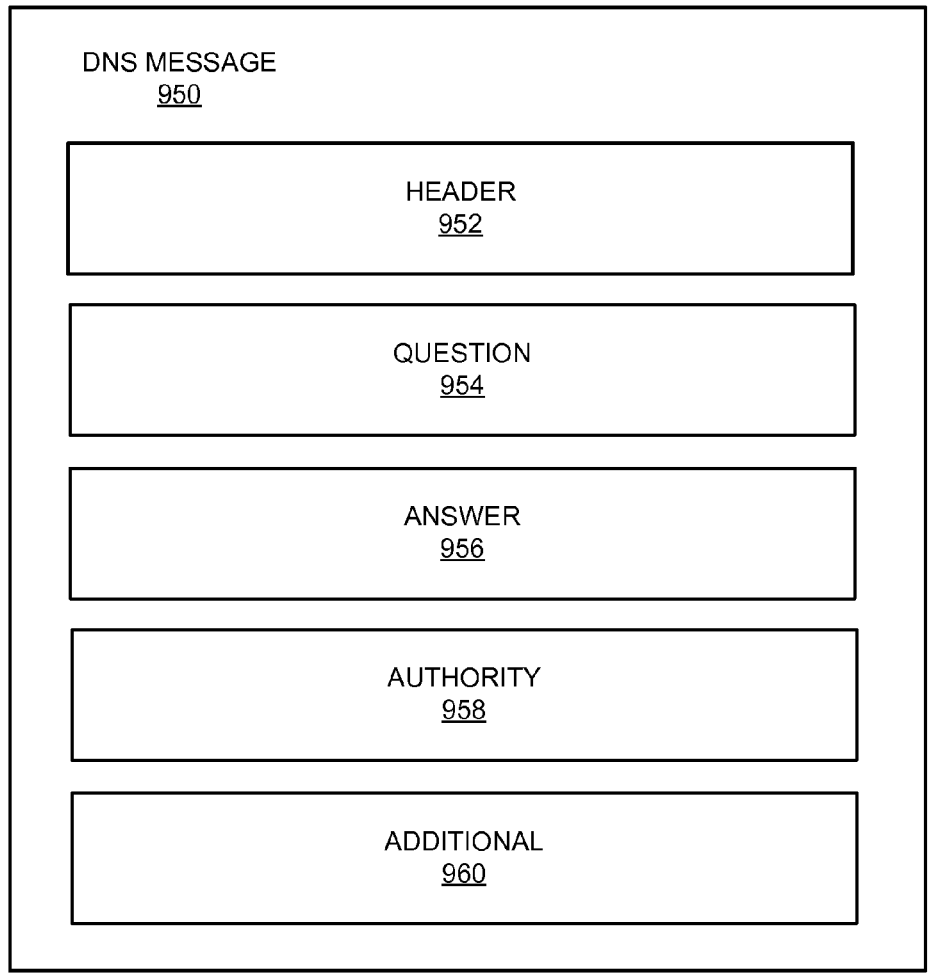
FIG. 13 depicts the structure of an example of a DNS message.

FIG. 13 is a block diagram depicting the structure of a DNS message response or request 950. A DNS message includes a header field 952, a question field 954, an answer field 956, an authority field 958 and an additional field 960. The question field indicates the question for (or request) of the name server in a DNS request. The answer field in a DNS response includes one or more resource records answering a question from a DNS request. The authority field includes one or more resource records pointing to an authority. The additional field is structured like a resource record and can include various types of information, such as the subscriber identifier as described above.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of domain name system (DNS) processing, comprising:
   receiving at a DNS nameserver a first request for domain name information and a second request for domain name information, the first request being for a first domain and the second request being for a second domain;
   determining that the first request and the second request are associated with a first subscriber of DNS resolution services provided by the DNS nameserver;
   accessing a first subscriber identifier associated with the first subscriber;
   accessing domain name information for the first domain and domain name information for the second domain, the domain name information for the second domain being provided by an authoritative nameserver for the second domain;
   embedding the first subscriber identifier in the domain name information for the first domain;
   generating a first reply to the first request for domain name information, the first reply including the domain name information with the embedded first subscriber identifier; and
   generating a second reply to the second request for domain name information, the second reply including the domain name information for the second domain provided by the authoritative nameserver.

2. A method according to claim 1, further comprising:
   receiving at one or more web servers a first resource request having the domain name information with the embedded first subscriber identifier;
   determining at the one or more web servers the subscriber identifier from the domain name information;
   generating a first domain identifier corresponding to a third domain, the first domain identifier including the first subscriber identifier; and
   generating a first resource reply in response to the first resource request, the first resource reply including a redirect to the third domain and the first domain identifier corresponding to the third domain.

3. A method according to claim 2, further comprising, prior to receiving the first request for domain information for the first domain:
   receiving at the DNS nameserver a third request for domain name information, the third request being for a fourth domain that is not associated with the one or more web servers;
   determining that the third request is associated with the first subscriber of DNS resolution services provided by the DNS nameserver;
   accessing the subscriber information based on the first subscriber identifier; and
   generating a third DNS reply in response to the second request for domain name information, the third DNS reply including domain name information associated with the third domain.

4. A method according to claim 3, wherein:
   the domain name information associated with the third domain is domain name information associated with a block page service at the third domain; and
   the domain name information for the first domain is domain name information associated with an identification service at the first domain.

5. A method according to claim 4, further comprising:
   receiving at the block page service a second resource request, the second resource request being for the third domain and including the domain name information associated with the block page service; and
   generating a second resource reply in response to the second resource request, the second resource reply including a redirect to the identification service.

6. A method according to claim 5, further comprising:
   receiving a third resource request at the block page service, the third resource request including the first domain identifier, the first domain identifier corresponding to the block page service;
   accessing the first domain identifier corresponding to the block page service to determine the first subscriber identifier; and
   generating a third resource reply in response to the third resource request, the third resource reply being based on the first subscriber identifier.

7. A method according to claim 6, wherein:
   the third resource request includes a universal resource locator for the block page service, the universal resource locator including an identification for the fourth domain.

8. A method according to claim 7, further comprising:
   accessing the subscriber information based on the subscriber identifier;
   determining whether the first subscriber is permitted access to the fourth domain based on the subscriber information; and
   wherein if the first subscriber is permitted access, generating the third resource reply includes generating a second domain identifier for the fourth domain and a redirect to the fourth domain; and
   wherein if the first subscriber is not permitted access, generating the third resource reply includes providing a resource from the block page service.

9. A method according to claim 8, further comprising:
   receiving a fourth resource request at the block page service, the fourth resource request being for the fourth domain;
   determining that the fourth resource request includes the second identifier for the fourth domain; and generating a fourth resource reply in response to the fourth resource request, the fourth resource reply including one or more resources from the fourth domain.

10. A method according to claim 2, wherein:
the first domain identifier corresponding to the third domain is a cookie for a block page service at the web server; and
an identification service at the first domain generates the cookie for the block page service at the third domain.

11. A method according to claim 2, wherein:
the subscriber information includes at least one of a network record and a user record.

12. A method according to claim 1, wherein:
embedding the first subscriber identifier in the domain name information for the first domain includes embedding the first subscriber identifier into an IP address for the first domain.

13. A method according to claim 12, wherein:
embedding the first subscriber identifier in the domain name information for the first domain includes embedding the first subscriber identifier into a predetermined octet of the IP address for the first domain.

14. A system comprising:
a domain name system (DNS) nameserver including one or more processors coupled to a memory configured to:
associate a plurality of internet protocol (IP) addresses with a first domain;
receive a request for domain name information associated with the first domain;
determine a subscriber identifier associated with the request;
select a first IP address from the plurality of IP addresses based on the subscriber identifier;
generate a reply to the request for domain name information including the first IP address; and
one or more web servers including one or more processors coupled to a memory configured to:
receive a resource request including the first IP address;
generate a cookie including the subscriber identifier;
generate a reply to the resource request including a redirect and the cookie having the subscriber identifier.

15. A system according to claim 14, wherein the DNS nameserver is configured to, prior to the receipt of the request for domain name information associated with the first domain:
receive a request for domain name information associated with a requested domain;
determine the subscriber identifier associated with the request for domain name information;
determine subscriber information associated with the subscriber identifier;
based on the subscriber information, generate a reply to the request for domain name information associated with the requested domain including domain name information associated with a block page service configured at the one or more web servers.

16. A system according to claim 15, wherein the one or more web servers are configured with the block page service to, prior to the receipt of the resource request including the domain name information with the embedded subscriber identifier:
receive a resource request for the requested domain;
determine if the resource request includes the cookie having the subscriber identifier;
if the resource request does not include the cookie, generate a reply to the resource request having a redirect to an identification service at the one or more web servers;
if the resource request includes the cookie, determine the subscriber information associated with the subscriber identifier and generate a reply to the resource request based on the subscriber information.

17. A system according to claim 16, wherein the one or more web servers are configured with the block page service to:
determine if the subscriber information indicates that the subscriber may access the requested domain;
if the subscriber information indicates that the subscriber may access the requested domain, generate the reply to include a redirect to the requested domain and a cookie for the requested domain.

18. A system according to claim 14, wherein the first IP address includes a portion of the subscriber identifier, the DNS nameserver is configured to:
receive a plurality of requests for domain name information associated with the identification service, the plurality of requests being associated with the subscriber identifier; and
generate a plurality of replies to the plurality of requests for domain name information, each reply of the plurality including a different one of the plurality of IP addresses associated with the first domain, each of the different one of the plurality of IP addresses includes a different portion of the subscriber identifier.

19. One or more non-transitory processor readable storage media having processor readable code embodied on the one or more processor readable storage media, the processor readable code for programming one or more processors to perform a method of domain name system (DNS) processing, comprising:
maintaining at a DNS nameserver a plurality of internet protocol (IP) addresses that are associated with a first domain;
receiving at a DNS nameserver a first request for domain name information associated with the first domain;
determining that the first request is associated with a first subscriber of DNS resolution services provided by the DNS nameserver;
accessing a first subscriber identifier associated with the first subscriber;
selecting a first IP address from the plurality of IP addresses based on the subscriber identifier; and
generating a first reply to the first request for domain name information including the first IP address.

* * * * *